(12) United States Patent
Hall et al.

(10) Patent No.: US 8,756,314 B2
(45) Date of Patent: Jun. 17, 2014

(54) SELECTIVE REGISTRATION FOR REMOTE EVENT NOTIFICATIONS IN PROCESSING NODE CLUSTERS

(75) Inventors: Cheryl L. Hall, Austin, TX (US); Rajeev Mishra, Bangalore (IN); Trishali Nayar, Pune (IN); Lance W. Russell, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/427,195

(22) Filed: Mar. 22, 2012

(65) Prior Publication Data
US 2012/0198478 A1   Aug. 2, 2012

Related U.S. Application Data

(63) Continuation of application No. 12/879,414, filed on Sep. 10, 2010.

(51) Int. Cl.
*G06F 15/173* (2006.01)

(52) U.S. Cl.
USPC ........... 709/224; 709/200; 709/206; 719/318; 707/102; 714/57

(58) Field of Classification Search
CPC ................ H04L 12/4641; G06F 9/542; G06F 2209/544; G08B 21/22; G08B 27/006; G08B 13/1427; G08B 25/006; G08B 31/00
USPC ........... 709/200, 224, 206; 719/318; 707/102; 714/57
See application file for complete search history.

(56) References Cited

U.S. PATENT DOCUMENTS

| | | | | |
|---|---|---|---|---|
| 6,038,563 | A * | 3/2000 | Bapat et al. | 1/1 |
| 6,064,656 | A * | 5/2000 | Angal et al. | 370/254 |
| 6,185,613 | B1 * | 2/2001 | Lawson et al. | 709/224 |
| 6,230,160 | B1 | 5/2001 | Chan et al. | |
| 6,411,967 | B1 | 6/2002 | Van Renesse | |
| 6,591,317 | B1 | 7/2003 | Schzukin et al. | |
| 6,631,363 | B1 * | 10/2003 | Brown et al. | 719/318 |
| 6,754,704 | B1 | 6/2004 | Prorock | |
| 6,778,504 | B2 | 8/2004 | Santry et al. | |
| 6,862,619 | B1 * | 3/2005 | Sugauchi et al. | 709/224 |
| 6,983,324 | B1 | 1/2006 | Block et al. | |

(Continued)

OTHER PUBLICATIONS

Office Action in U.S. Appl. No. 12/879,414 mailed on Apr. 30, 2013, 20 pages (pp. 1-20 in pdf).

*Primary Examiner* — Anthony Mejia
(74) *Attorney, Agent, or Firm* — Mitch Harris, Atty at Law, LLC; Andrew M. Harris; Matthew W. Baca

(57) ABSTRACT

An event notification method for distributed processing systems provides remote and local node event notification in systems that require local registration of an event consumer in order produce an event notifications. To provide notification of an event occurring on a remote node, either event consumers on all nodes in the cluster register locally to receive event notifications and specify that the event is a cluster event, in which case the nodes send notification of their locally-occurring events to all nodes, or remote registrations are accepted at nodes and if a local consumer for the event is not present, a listener thread registers as an event consumer. The listener thread sends the event notifications to the remote nodes registered as consumers for the event by observing communication between the event producer and the local consumer, or receiving the event notifications directly if there is no local consumer.

15 Claims, 9 Drawing Sheets

(56) References Cited

U.S. PATENT DOCUMENTS

| | | | |
|---|---|---|---|
| 7,051,105 B2 | 5/2006 | Lauzon et al. | |
| 7,058,957 B1 | 6/2006 | Nguyen | |
| 7,542,437 B1 | 6/2009 | Redi et al. | |
| 7,571,230 B2* | 8/2009 | Gissel et al. | 709/224 |
| 7,650,404 B2* | 1/2010 | Parupudi et al. | 709/224 |
| 7,657,450 B2 | 2/2010 | Amit et al. | |
| 7,664,125 B1 | 2/2010 | Bauer et al. | |
| 7,747,717 B2 | 6/2010 | Colrain | |
| 7,856,480 B2 | 12/2010 | Muchow | |
| 7,913,105 B1* | 3/2011 | Ganesh et al. | 709/224 |
| 8,108,715 B1 | 1/2012 | Agarwal | |
| 8,161,053 B1 | 4/2012 | Khan et al. | |
| 8,384,549 B2* | 2/2013 | Lemmon | 340/573.1 |
| 8,433,760 B2 | 4/2013 | Ganapathy et al. | |
| 8,484,472 B2* | 7/2013 | Sherkin et al. | 713/170 |
| 2002/0083030 A1 | 6/2002 | Yang et al. | |
| 2002/0178275 A1* | 11/2002 | Hein et al. | 709/231 |
| 2003/0061340 A1 | 3/2003 | Sun et al. | |
| 2003/0088831 A1* | 5/2003 | Bauer et al. | 715/516 |
| 2003/0093516 A1* | 5/2003 | Parsons et al. | 709/224 |
| 2003/0105801 A1* | 6/2003 | Tse et al. | 709/202 |
| 2003/0225840 A1 | 12/2003 | Glassco et al. | |
| 2003/0233594 A1 | 12/2003 | Earl | |
| 2004/0008727 A1 | 1/2004 | See et al. | |
| 2004/0030775 A1* | 2/2004 | Lauzon et al. | 709/224 |
| 2004/0064835 A1* | 4/2004 | Bellwood et al. | 725/87 |
| 2004/0088716 A1 | 5/2004 | Solter | |
| 2004/0172467 A1 | 9/2004 | Wechter et al. | |
| 2005/0065953 A1 | 3/2005 | Bower et al. | |
| 2005/0076145 A1 | 4/2005 | Ben-Zvi et al. | |
| 2005/0152396 A1* | 7/2005 | Pichna et al. | 370/467 |
| 2005/0234929 A1* | 10/2005 | Ionescu et al. | 707/100 |
| 2006/0031282 A1* | 2/2006 | Tuttle et al. | 709/203 |
| 2006/0050629 A1 | 3/2006 | Saika | |
| 2006/0271676 A1 | 11/2006 | Talayco et al. | |
| 2007/0041328 A1 | 2/2007 | Bell | |
| 2007/0140243 A1* | 6/2007 | Eastham | 370/390 |
| 2007/0226182 A1* | 9/2007 | Sobotka et al. | 707/3 |
| 2007/0282959 A1* | 12/2007 | Stern | 709/206 |
| 2008/0008106 A1* | 1/2008 | Boberg et al. | 370/270 |
| 2008/0077635 A1* | 3/2008 | Sporny et al. | 707/204 |
| 2008/0183857 A1 | 7/2008 | Barfield et al. | |
| 2008/0317050 A1 | 12/2008 | Xiong et al. | |
| 2009/0043887 A1 | 2/2009 | Coekaerts | |
| 2009/0138808 A1* | 5/2009 | Moromisato et al. | 715/758 |
| 2009/0199051 A1* | 8/2009 | Jann et al. | 714/57 |
| 2010/0077310 A1* | 3/2010 | Karachale et al. | 715/736 |
| 2010/0094922 A1* | 4/2010 | Sathish | 709/201 |
| 2010/0099447 A1* | 4/2010 | Boberg et al. | 455/466 |
| 2010/0113072 A1* | 5/2010 | Gibson et al. | 455/466 |
| 2010/0153528 A1* | 6/2010 | Pearson et al. | 709/223 |
| 2010/0223492 A1 | 9/2010 | Farrugia et al. | |
| 2010/0274885 A1* | 10/2010 | Yoo et al. | 709/224 |
| 2010/0281304 A1 | 11/2010 | Moyer et al. | |
| 2010/0290469 A1 | 11/2010 | Assarpour | |
| 2010/0332277 A1 | 12/2010 | Dentzer et al. | |
| 2011/0035462 A1* | 2/2011 | Akella | 709/217 |
| 2011/0041140 A1* | 2/2011 | Harm et al. | 719/318 |
| 2011/0093743 A1 | 4/2011 | Arcese et al. | |
| 2011/0145639 A1* | 6/2011 | Farahmand et al. | 714/25 |
| 2011/0202500 A1 | 8/2011 | Warn et al. | |
| 2011/0274053 A1 | 11/2011 | Baik et al. | |
| 2012/0036250 A1* | 2/2012 | Vaswani et al. | 709/224 |
| 2012/0047257 A1* | 2/2012 | Hauser | 709/224 |
| 2012/0144018 A1 | 6/2012 | Fried et al. | |
| 2012/0203897 A1 | 8/2012 | Mishra et al. | |
| 2012/0203899 A1 | 8/2012 | Ganapathy et al. | |
| 2013/0042001 A1* | 2/2013 | Gould et al. | 709/224 |

* cited by examiner

SELECTIVE REGISTRATION FOR REMOTE EVENT NOTIFICATIONS IN PROCESSING NODE CLUSTERS

The Present Application is a Continuation of U.S. patent application Ser. No. 12/879,414, filed on Sep. 10, 2010 and thus claims priority thereto under 35 U.S.C. 120.

BACKGROUND

1. Field of the Invention

The present invention is related to handling of event notifications in large-scale distributed computer systems, and more specifically to handling of registration for remote event notifications in processing mode clusters.

2. Description of Related Art

In large-scale distributed computer systems, such as those using distributed software models to perform tasks, multiple nodes provide independent execution of sub-tasks. The nodes are typically organized into clusters in order to perform specific tasks and/or as a physical organization of a processing system, for example, clustering by processor affinity. In order to keep such a system operational, and further, to provide indication of events occurring at one node that either require a reaction from another node or indicate to the other node that either an erroneous operating condition has occurred, or that a phase of processing is complete. In particular, event notification and event logging are operations used to indicate system health to system administrators or software applications, including operating systems components.

Health monitoring techniques employed in distributed processing systems perform an important function in that connections to other nodes must be reliable and all of the active nodes that have been assigned tasks need to perform those tasks in order to ensure that the totality of the processing requirements are met, and in a timely fashion. The health of a node-based distributed processing system is typically monitored by: 1) a heartbeat messaging system, which passes messages between the nodes and a central monitoring component; and 2) an event notification system that signals interested nodes when events occur on other nodes. Event notification systems in node-based distributed processing systems typically require an interested application (a consumer) to register to receive event notifications either with a centralized event manager, or with the processes or objects that generate the events (an event producer).

BRIEF SUMMARY

The invention provides event notification methods that provide local and remote event notification to event consumers in systems that require a local consumer for event notification. The methods always provide a local consumer at a node for which a remote notification is needed, where the remote notification is directed to a node having an interested consumer.

In one embodiment of the invention, event consumers register locally to receive event notifications for a particular event type and specify whether or not they are to receive notifications when the event type occurs on a remote node using an indication that the event of interest is to be handled as a cluster event. A cluster event is an event for which the event consumer should be notified if the event occurs on any node of the cluster. If the event of interest is a cluster event, then event consumers are started on all nodes and also register the event as a cluster event. When the event manager receives a request to register for a cluster event, when the event occurs, the event notification is sent to all other nodes. Otherwise, if the event is not a cluster event, the event notification is only provided to the local consumer(s) and is not propagated among the nodes.

In another embodiment of the invention, event consumers register to receive event notifications for a particular event type and specify from which nodes they are to receive notifications. If a node registers to receive an event from a remote node and there is no local consumer for the event on the remote node, a listener thread registers as a local consumer on the remote node. Otherwise the listener thread monitors communication of the event from the event producer to the local consumer on the remote node. When the event occurs, the listener thread on the node that generated the event sends an event notification to only the remote nodes that have registered to receive the event.

The event notification methods can be implemented in a mountable file system in which file (or device) open, read and write requests are received from event consumers and interpreted as event registrations by the file system implementation, providing a facile and portable mechanism for providing event notifications between nodes in a distributed processing system. The files within this file system represent events that event consumers may monitor.

The foregoing and other objectives, features, and advantages of the invention will be apparent from the following, more particular, description of the preferred embodiments of the invention, as illustrated in the accompanying drawings.

BRIEF DESCRIPTION OF THE SEVERAL VIEWS OF THE DRAWING

The novel features believed characteristic of the invention are set forth in the appended claims. The invention itself, however, as well as a preferred mode of use, further objectives, and advantages thereof, will best be understood by reference to the following detailed description of the invention when read in conjunction with the accompanying Figures, wherein like reference numerals indicate like components, and:

DETAILED DESCRIPTION

The present invention encompasses techniques for event notification in clusters of nodes within distributed computing systems. In particular, embodiments of the invention provide remote event notification techniques that may be used within systems that require local event consumers in order for an event producer to generate event notifications and/or for the event notification framework to recognize the event notifications. According to one embodiment of the invention, a local event consumer is started on every node when an event type is designated as a cluster event. The starting of the local event consumers is the responsibility of the user, who starts the monitoring of the event on every node according to the particular service or application that implements the monitoring. If the event type is a cluster event, each node sends event notifications to all of the other nodes when an event of that type occurs on the node. According to another embodiment of the invention, nodes are informed of a subset of interested nodes that should receive event notifications for an event type, and if no local consumer for each particular event type is present on a given node, a listener thread registers as a local event consumer.

Figure 1:
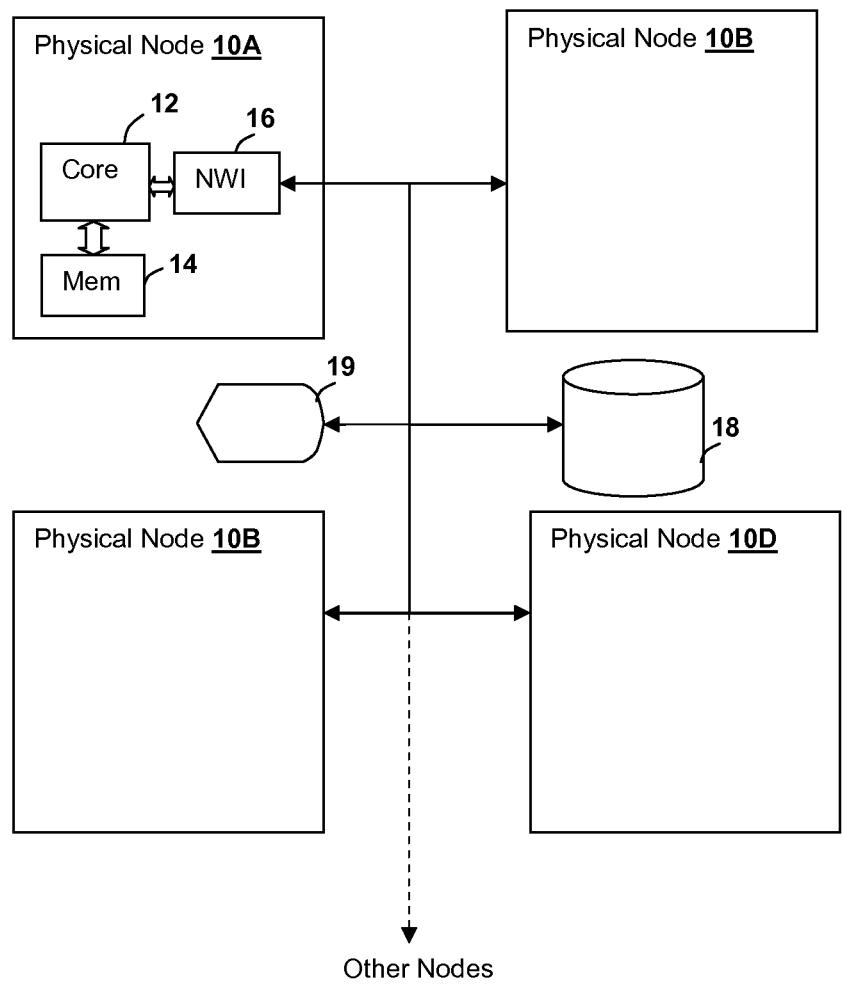
FIG. 1 is a block diagram of a distributed computer system in which techniques according to an embodiment of the present invention are practiced.

Referring now to FIG. 1, a distributed computer system in accordance with an embodiment of the present invention is shown. A first physical processing node 10A includes a processor core 12 coupled to a memory 14 that stores program instructions for execution by processor 12. The program instructions include program instructions forming computer program products in accordance with embodiments of the invention that provide event notification between either physical processing nodes 10A-10D, virtual processing nodes partitioned within the depicted computer system as will be described in further detail below, or both. Processing node 10A also includes a network interface (NWI) 16 that couples processing node 10A to a wired, wireless or hybrid network, which may be a standardized network such as Ethernet, or a proprietary network or interconnect bus. Other processing nodes 10B-10D are of identical construction in the exemplary embodiment, but embodiments of the invention may be practiced in asymmetric distributed systems having nodes with differing features. Although only four compute nodes 10A-10D are illustrated, a distributed computer system in accordance with an embodiment of the present invention will generally include a large number of compute nodes connected via one or more networks. The distributed computer system of FIG. 1 also includes other resources such as I/O devices 19, including graphical display devices, printers, scanners, keyboards, mice, which may be coupled to the network or one of nodes 10A-10D via workstation computers that provide a user interface to administrative personnel and other users. Nodes 10A-10D are also coupled to storage devices 18, for storing and retrieving data and program instructions, such as storing computer program products in accordance with an embodiment of the invention.

Figure 2:
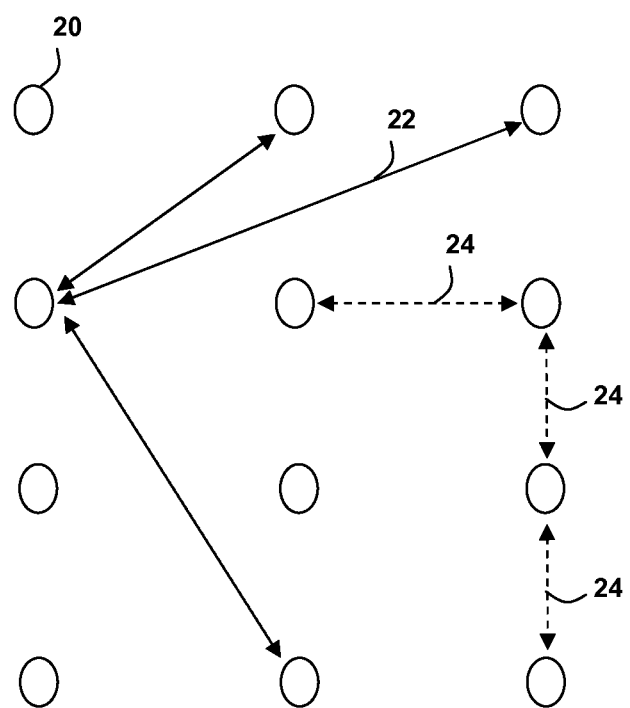
FIG. 2 is a pictorial diagram depicting communication between nodes of a computer system in accordance with an embodiment of the present invention.

Referring now to FIG. 2, communication between multiple nodes 20 of the distributed computer system of FIG. 1 is shown. As mentioned above, nodes 20 may correspond exactly on a one-to-one basis with processing nodes 10A-10D (and other nodes) of FIG. 1, or nodes 20 may be partitioned in a different manner as virtual processing nodes. For example, a single node 20 may have exclusive use of multiple processing nodes, e.g. nodes 10A-10B, and result in a system having a greater number of virtual nodes than processing nodes, or alternatively, multiple nodes 20 may be implemented on a single processing node, e.g., node 10A. In the present invention, each of nodes 20 represents at least one operating system image and one or more applications executing within the operating system image. In general, the entire system as depicted may execute a single application, but sub-tasks within the application are apportioned to the various nodes 20, which may be identical sub-tasks or different sub-tasks. The present invention concerns event notification within the computer system of FIG. 1, in which events are communicated between nodes 20 via event notification messages. Other messages are also passed between nodes 20, including data and program code transmissions, and messages as needed to support features of embodiments of the present invention, such as indications to remote nodes that event notifications of a particular event type are of interest to another node. A separate physical network may be provided for administrative tasks such as event notification and heartbeat messaging, or the same physical networks may be used. Nodes are generally arranged in a cluster, which is a group of virtual or physical processing nodes organized to perform a particular task or group of tasks, e.g., for a particular customer. As illustrated, communication between nodes in a cluster may be accomplished by direct node to node communications 22 or by next-neighbor communications 24 in which nodes 20 pass along messages to other nodes 20. Another alternative is to use a central facility for inter-node communication. However, since the present invention provides a high availability event notification system having low latency, it is generally preferable not to use a central clearinghouse for events and other messages.

While event notification in accordance with embodiments of the present invention may be implemented using a variety of event notification mechanisms, such as direct object-to-object interfaces, using operating system-maintained signaling object such as semaphores, in the depicted embodiment, the event notification is provided by a special file system that implements an event manager. Event consumers, i.e., the applications or objects interested in receiving event notifications, register to receive event notifications by calling file operation functions/methods on an interface to the file system. Event producers notify the file system of events via a separate application programming interface (API) provided by the event manager. The event manager then provides the event notifications to the event consumers interested in the particular events represented by the event notifications. In the depicted embodiment, the file system is a kernel extension, which facilitates availability and uniformity of the event manager at each node in the system. Further details of a filesystem based event manager are provided in U.S. Patent Application Publication U.S. 200901991051, which is incorporated herein by reference. The event notification system the "Autonomic Health Advisor File System" (AHAFS) disclosed in the above-incorporated U.S. patent application does not provide direct event notification between the nodes, so a separate layer is used for inter-node event communication. The generic methods open( ) and write( ) described below are understood to include specific file operations fopen( ) and fwrite( ) as alternatives, or other operations provided in a file system interface that can be used to provide the same type of information flow.

Figure 3:
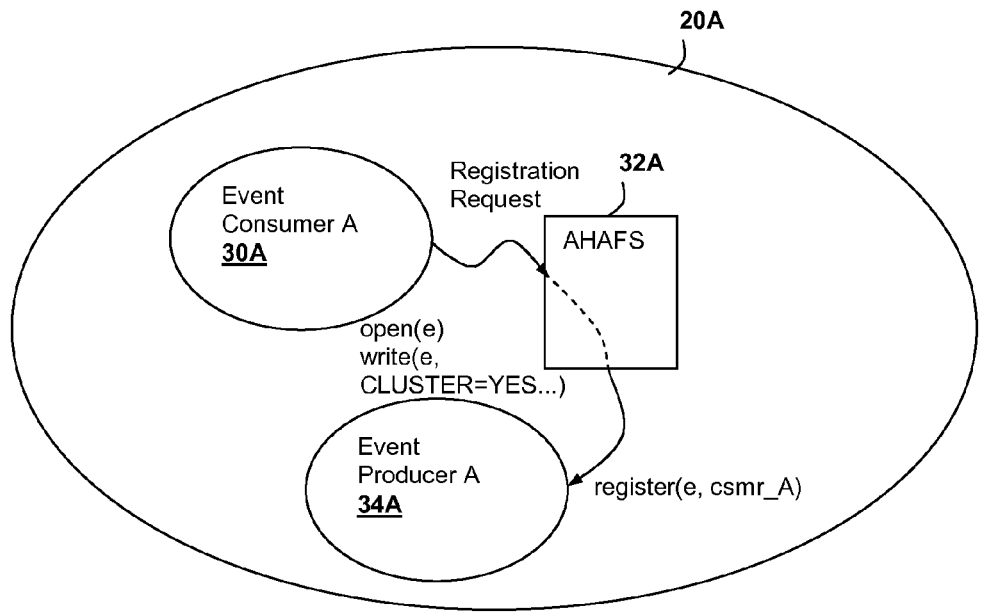
FIG. 3 is a pictorial diagram depicting information flow in a computer system in accordance with an embodiment of the present invention.
Figure 3:
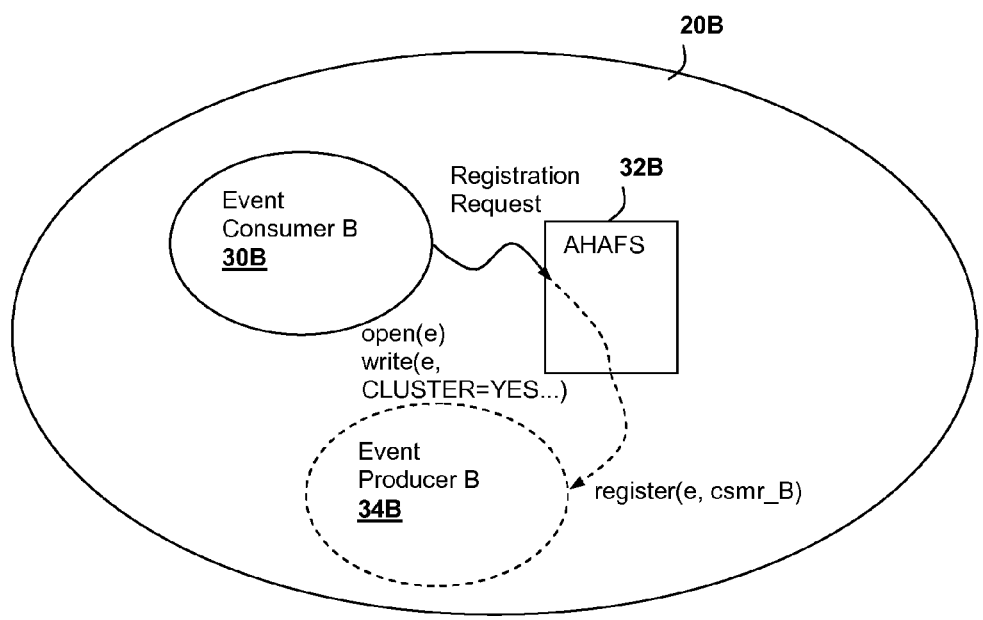

Referring now to FIG. 3, information flow within an event notification system according to an embodiment of the invention is shown. A first node 20A has an event consumer 30A that is interested in receiving notifications of occurrences of an event type e, occurring on any of the nodes 20 in the cluster. Event consumer 30A calls the open( ) method on the AHAFS file system interface 32A and then calls the write( ) file system interface with arguments including e to identify the event type and x, which is a flag that indicates whether or not the event is a "cluster event" (CLUSTER=YES). Event consumer 30A also provides a callback interface (or alternatively a signaling object such as a semaphore for which a thread of event consumer 30A can wait) to the write( ) method. AHAFS interface 32A then notifies the corresponding event producer A 34A that event consumer 30A should receive notifications of occurrences of event e. The registration is provided through a register( ) callback API provided by the event producers that accepts the event identifier and a security credential of the interested event consumer. The security credential of the event consumer is obtained by the AHAFS interface when the event consumer calls the open( ) and write( ) interface methods. For proper notification of cluster event e at event consumer 30A, two actions must be performed within the cluster: 1) event consumer 30A must register event e as a cluster event by calling open( ) and then by calling write( ) to write CLUSTER=YES; and 2) an event consumer, e.g., event consumer 30B, must be started on each of the other nodes, e.g., node 20B, of the cluster and must register for notification of event e as a cluster event (i.e., by calling the open( ) and then the write( ) method for event e on local AHAFS interface 32B with CLUSTER=YES). Each node 20 responds to such an event registration by sending all events registered as cluster events to all other nodes 20, i.e., AHAFS interfaces 32A-32B are implemented such that events marked as cluster events are broadcast to other nodes.

Figure 4:
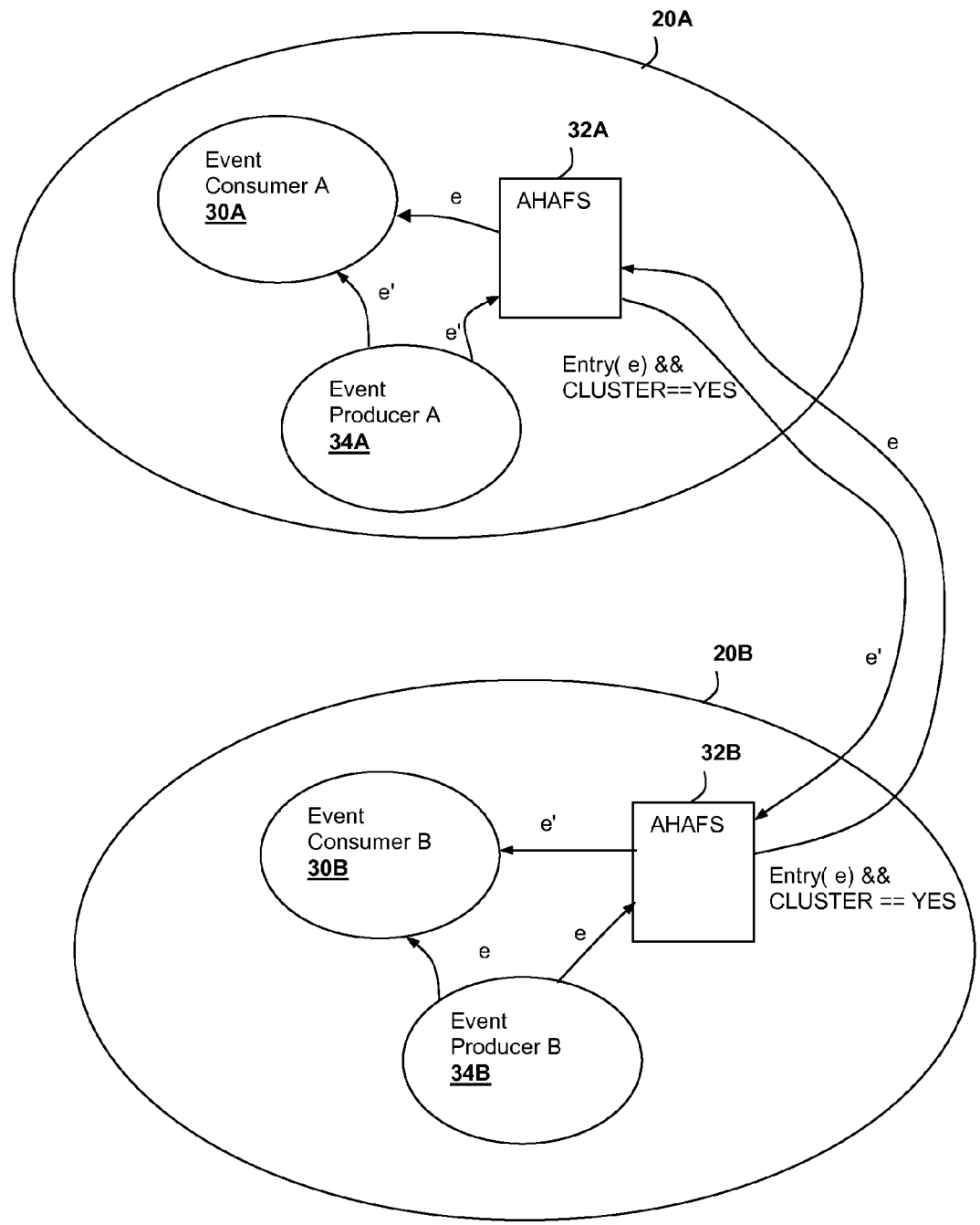
FIG. 4 is a pictorial diagram depicting event notification in a computer system in accordance with an embodiment of the present invention.

Referring now to FIG. 4, event notification information flow in a system in accordance with an embodiment of the invention is shown. When event producer 34B on node 20B produces event e, local event consumer 30B is notified and AHAFS interface 32B determines whether event e is registered as a cluster event. Since event e was registered as a cluster event, AHAFS interface 32B broadcasts the corresponding event notification to the other nodes in the cluster. Node 20A receives the event notification for event e and notifies event consumer 30A that event e occurred on node 20B. Similarly, if event producer 34A generates event e', which has the same event type as event e, Event consumer 30A is notified, AHAFS interface 32A determines that event type e is registered as a cluster event and transmits an event notification for event e' to the other nodes in the system. Node 20B receives the event notification for event e' and AHAFS interface 32B notifies event consumer 30B that event e' has occurred on node 20A. If event e were not registered as a cluster event, then only local event consumer 30A would be notified of event e' and similarly only local event consumer 30B would be notified of event e.

Figure 5:
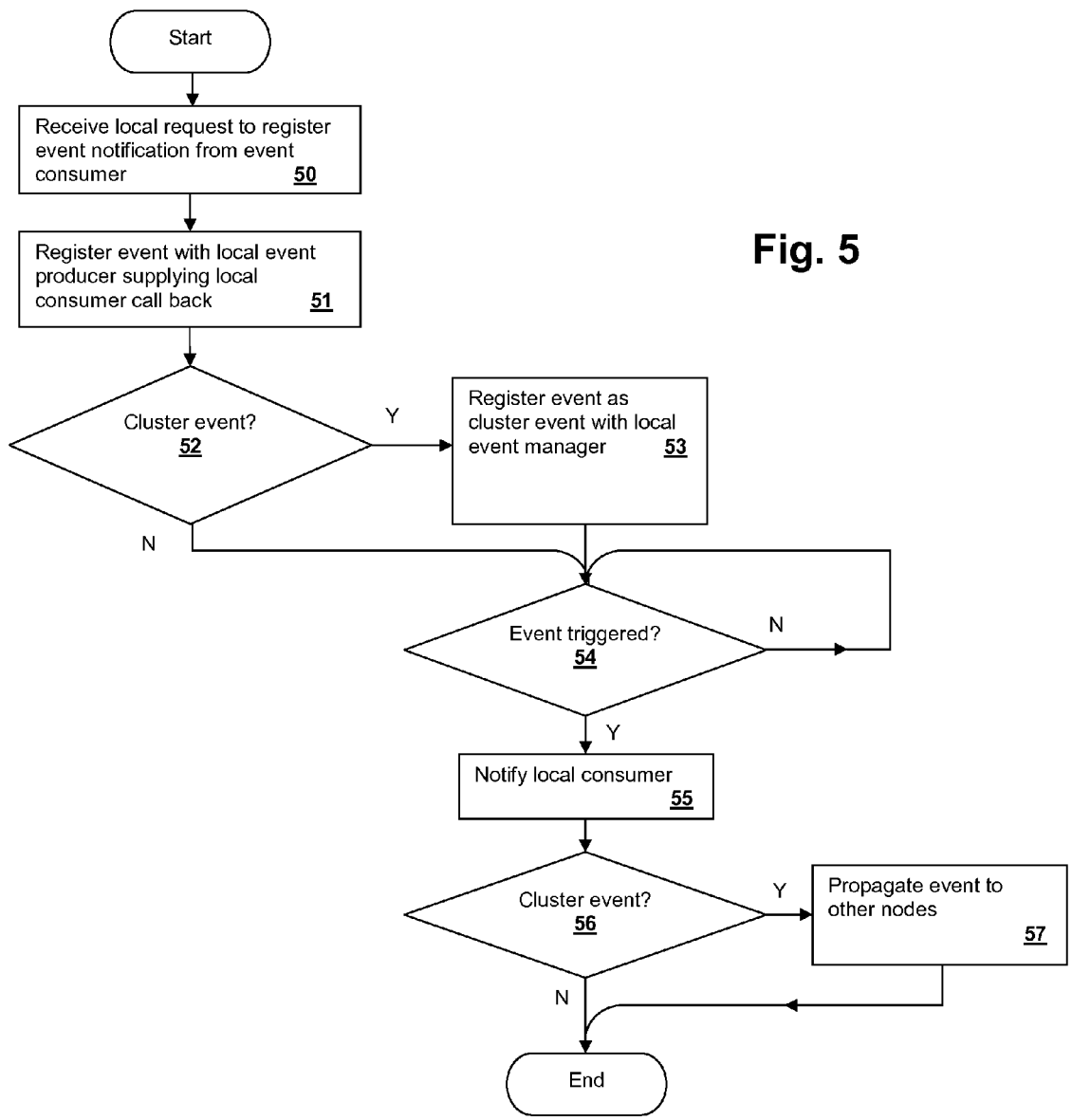
FIG. 5 is a flowchart of a method in accordance with an embodiment of the present invention.

Referring now to FIG. 5, a method in accordance with an embodiment of the invention is shown in a flowchart. When a local request is received to register an event from an event consumer (step 50), the event is registered with the local event producer (step 51). If the cluster event flag is set (decision 52), then the event is registered with AHAFS as a cluster event (step 53), otherwise the event registration is complete. When the event is triggered (decision 54), the local consumer is notified (step 55). If the event is a cluster event (decision 56), the event is propagated to other nodes in the cluster (step 57). Steps 54-57 are generally repeated and represent an independent process from steps 50-53, which may also be re-entered as events are registered/unregistered. The above-described embodiments of the invention referenced to FIGS. 3-5 represent one manner of providing for remote notification of events with low notification latency. With reference to FIGS. 6-9 below, another alternative embodiment of the invention will be described.

Figure 6:
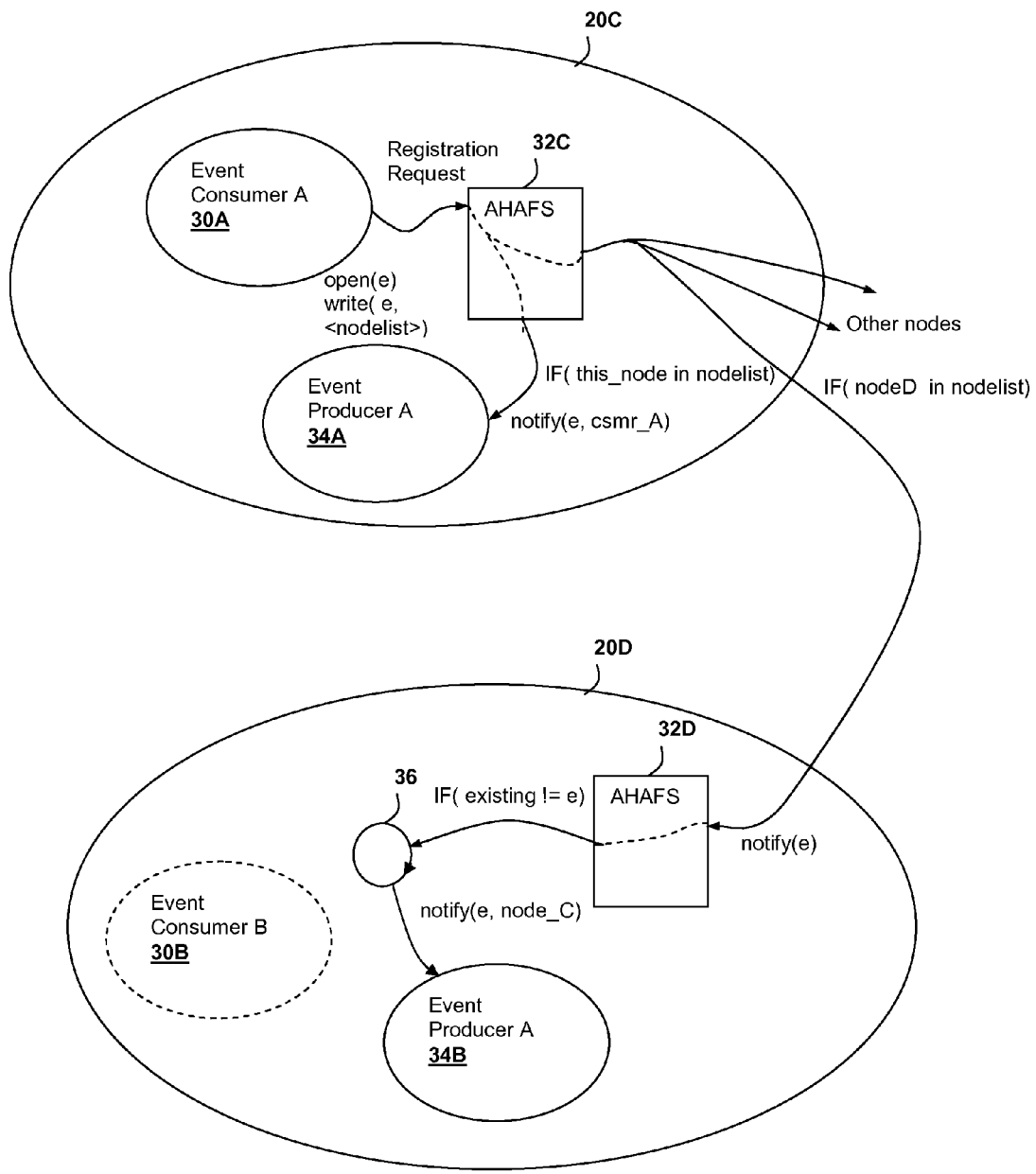
FIG. 6 is a pictorial diagram depicting information flow in a computer system in accordance with another embodiment of the present invention.

Referring now to FIG. 6, information flow within an event notification system according to an alternative embodiment of the invention is shown. A first node 20C has an event consumer 30A that is interested in receiving notifications of occurrences of an event type e, occurring a subset of nodes 20 in the cluster. Event consumer 30A calls the open( ) and write( ) methods on the AHAFS file system interface 32C with arguments including e to identify the event type and to write a set of node names or node IDs that indicates the nodes on which event consumer 30A is interested in receiving notifications of occurrences of event e. Event consumer 30A also provides a callback interface (or alternatively a signaling object such as a semaphore for which a thread of event consumer 30A can wait) to the write( ) method. If node 20C is in the subset of nodes specified by data structure subset, AHAFS interface 32C notifies local event producer 34A that event consumer 30A should receive notifications of occurrences of event e. For notification of event e at event consumer 30A from remote nodes specified in subset, AHAFS interface 32C sends registration requests to other nodes specified in data structure subset. The remote nodes, e.g., node 20D receive the registration requests, and if the local AHAFS interface 32D determines that no existing registration exists for event e, e.g., from event consumer 30B, a registration is made by a listener thread 36 that provides other functions as detailed below, so that listener thread will receive direct notification of events produced by event producer 34B and can send event notifications to nodes that have indicated interest in event e on node 20D, including node 20C. Otherwise, if a registration for event e exists, e.g., by local event consumer 30B, then AHAFS interface 32D only records the particular node and event consumer interested in event e on node 20D.

Figure 7:
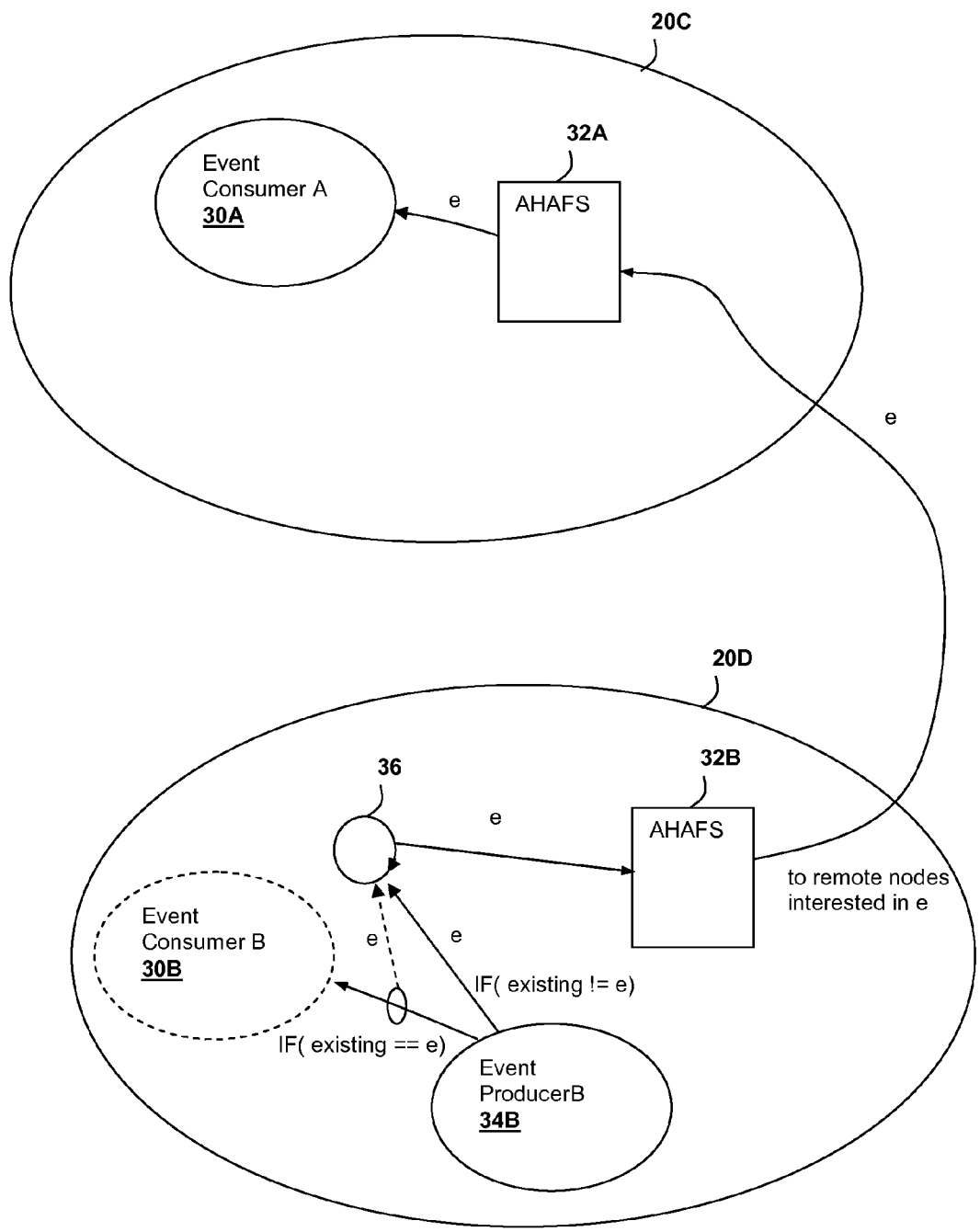
FIG. 7 is a pictorial diagram depicting event notification in a computer system in accordance with another embodiment of the present invention.

Referring now to FIG. 7, event notification information flow in a system in accordance with the alternative embodiment of the invention is shown. When event e occurs on node 20D, i.e., event producer 34B generates an event notification for event e, which is reported to event consumer 30B if event consumer 30B is registered to receive notifications for event e on node 20D. Otherwise, listener thread 36 has been registered to receive the notification as a proxy on node 20D. In either case, listener thread 36 either snoops on the event notification passed between event producer 34B and event consumer 30B for event e or receives the event notification directly as a proxy for one or more remote nodes. Listener thread 36 sends the event notification to remote nodes according to the remote nodes interested in event e, as recorded by AHAFS interface 32B. Node 20C receives the event notification for event e, determines the interested event consumer (s) recorded by AHAFS interface 32A and delivers an event notification for event e to event consumer 30A.

Figure 8:
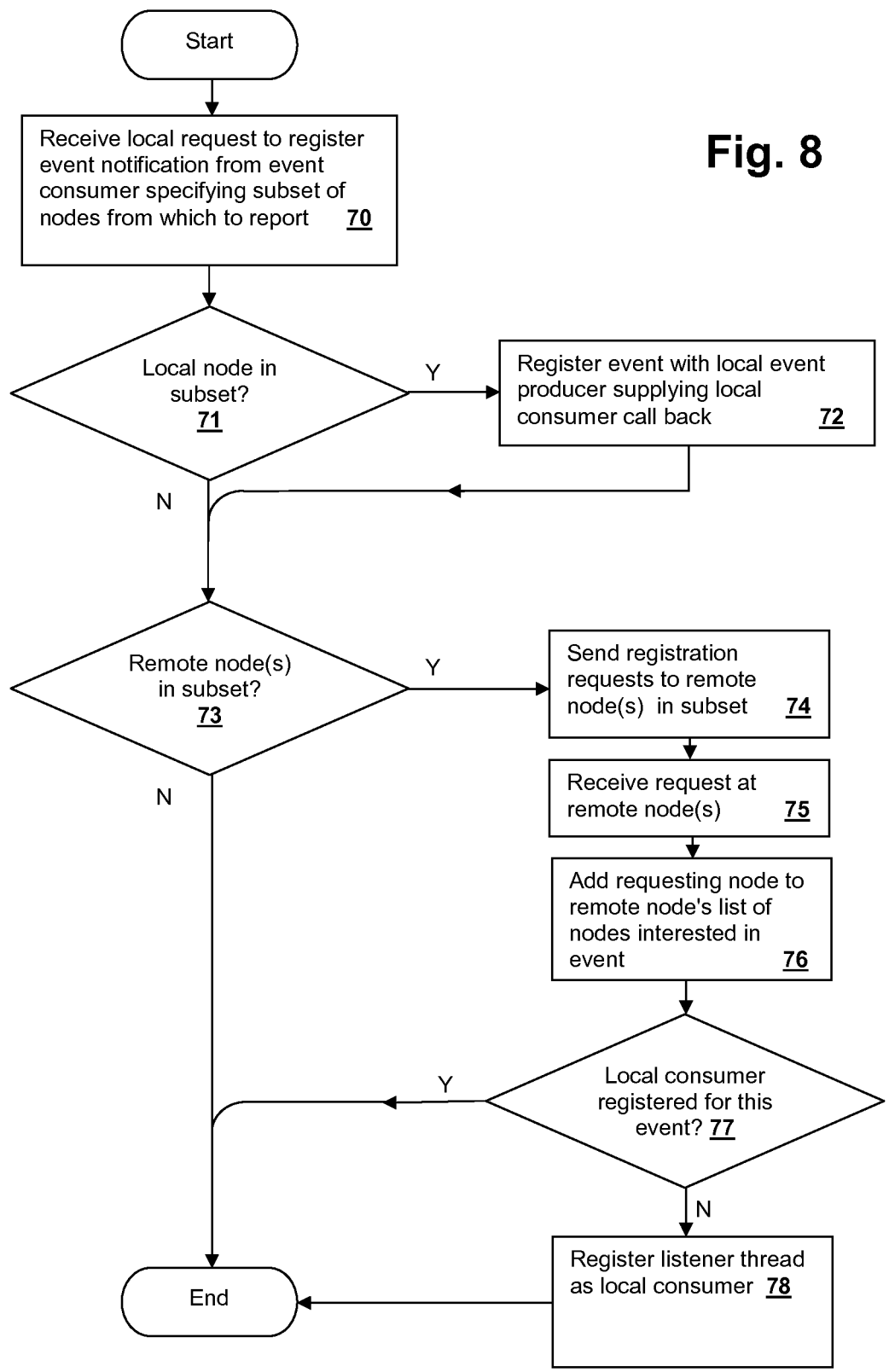
FIG. 8 is a flowchart of a method of event notification registration in accordance with another embodiment of the present invention.

Referring now to FIG. 8, a method in accordance with the alternative embodiment of the invention is shown in a flowchart. When a local request is received to register an event from an event consumer for a subset of interested nodes (step 70), if the local node is included in the subset (decision 71), then the event is registered with the local event producer (step 72). If there are remote nodes in the subset (decision 73), a registration request is sent to those nodes (step 74). When the requests are received at the remote nodes (step 75), the node issuing the request is added to the subset of nodes to receive notifications for the particular event (step 76). If there is a local consumer registered to receive notifications for the event (decision 77), registration is complete. Otherwise, if there is no local consumer registered to receive notifications for the event (decision 77), then a listener thread is registered as a local consumer (step 78).

Figure 9:
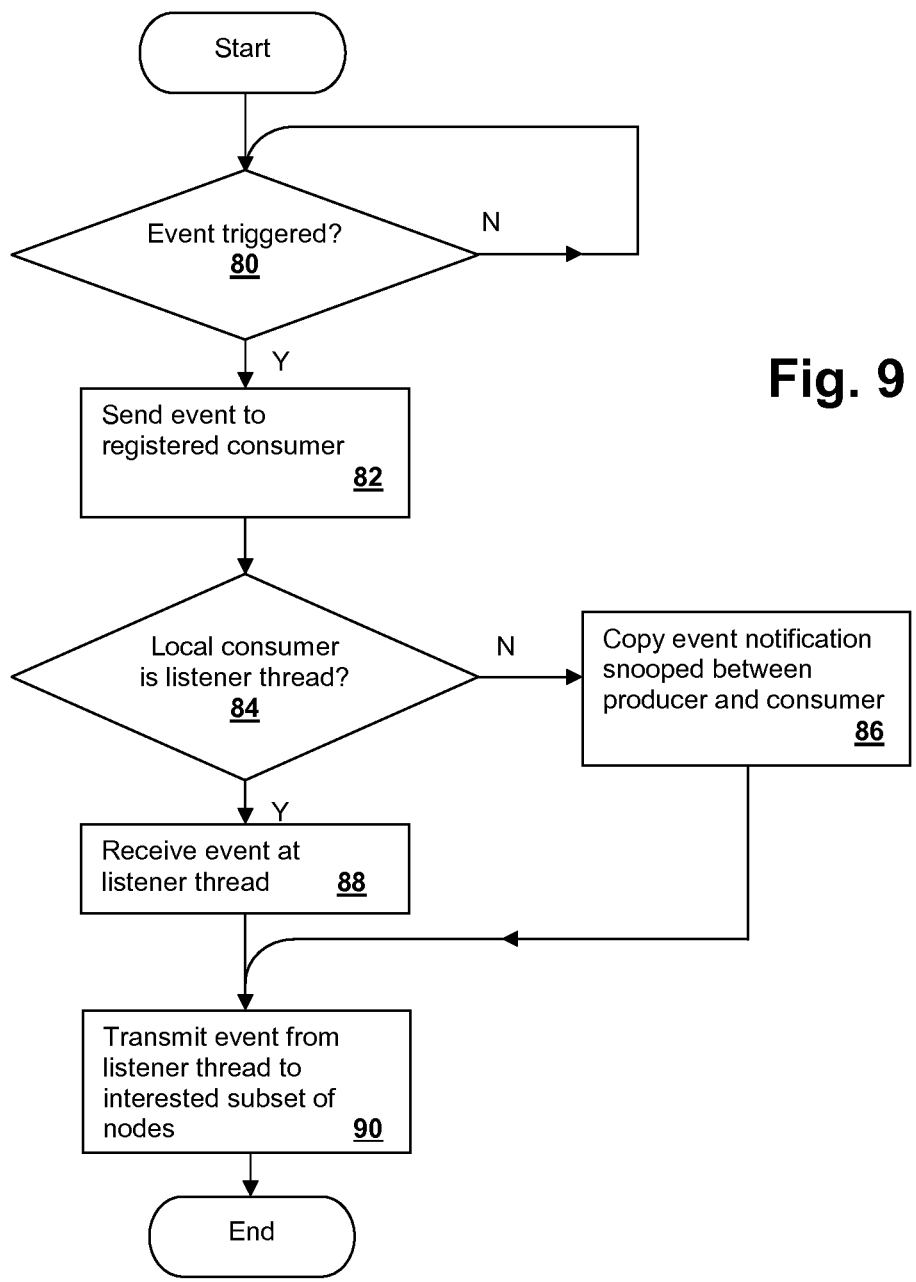
FIG. 9 is a flowchart of a method of event notification in accordance with another embodiment of the present invention.

Referring now to FIG. 9, a method in accordance with the alternative embodiment of the invention is shown in a flowchart. When the event is triggered (decision 80), the local consumer, which can be an event consumer or a listener thread is notified (step 82). If the local consumer is a listener thread (decision 84), the event is received by the listener thread (step 88). Otherwise, if the local consumer is an event consumer (decision 84), the listener thread snoops on the event notification and the event notification is copied (step 86). The event notification is then sent to the interested subset of remote nodes (step 90).

As noted above, the present invention may be embodied as a system, method, and/or a computer program product. A computer program product may be embodied in firmware, an image in system memory or another memory/cache, stored on a fixed or re-writable media such as an optical disc having computer-readable code stored thereon. Any combination of one or more computer readable medium(s) may be used to store the program instructions in accordance with an embodiment of the invention. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of the present application, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. Further, while the illustrative embodiment is directed to an AIX (AIX is a trademark of IBM) or other type of UNIX operating system (UNIX is a trademark of The Open Group), in which the event notification is provided by a mountable file system provided as a kernel extension, it is understood that the techniques of the present invention can be applied in event monitoring systems executing under any operating system and can be implemented using proprietary or standardized signaling interfaces as an alternative to the file system interface provided in the depicted embodiments.

While the invention has been particularly shown and described with reference to the preferred embodiments thereof, it will be understood by those skilled in the art that the foregoing and other changes in form and details may be made therein without departing from the spirit and scope of the invention.

What is claimed is:

1. A method for event notification within a computer system processing cluster comprising a plurality of physical or virtual processing modes, the method comprising:
   receiving a request from a remote node of the plurality of physical or virtual processing nodes at a local node of the plurality of physical or virtual processing nodes that differs from the remote node, that the remote node should be notified of occurrences of a particular event type, wherein the request is supplied in conjunction with an identifier of the remote node;
   responsive to receiving the request, determining whether or not a first local event consumer executing on the local node is registered to receive notifications of events of the event type on the local node;
   responsive to determining that a first local event consumer executing on the local node is not registered to receive notification of events of the event type on the local node, registering for the event type on the local node by a proxy event consumer;
   responsive to determining that a first local event consumer executing on the local node is registered to receive notification of events of the event type on the local node, not performing the registering for the event type on the local node by the proxy event consumer;
   detecting that an event of the event type has occurred on the local node; and
   responsive to detecting that the event matching the event type has occurred on the local node, sending a notification of the event from the proxy event consumer to the remote node using the identifier, wherein if the registering for the event type on the local node by the proxy event consumer was not performed, the proxy event consumer sends a copy of an event notification that has been provided to the first local event consumer.

2. The method of claim 1, wherein the registering registers a listener thread as the proxy event consumer for the event type, and wherein the listener thread performs the detecting by receiving an event notification from an event producer.

3. The method of claim 1, wherein the determining determines that the first local event consumer is registered to receive notifications of events of the event type, wherein the listener thread performs the detecting by observing communication of an event notification from an event producer to the first local event consumer, and wherein the sending is performed by the listener thread by copying the event notification and sending the event notification to the remote node.

4. The method of claim 1, further comprising:
   at an event management interface, receiving a request from a second event consumer on the remote node that the second event consumer should be notified of occurrences of a particular event type occurring on a subset of the nodes; and
   sending notifications only to nodes in the subset that the second event consumer should be notified of occurrences of the particular event type.

5. The method of claim 1, wherein the registering comprises issuing an open request and a write request at an interface of a file system that implements event notification in the computer system, and wherein the detecting an event comprises receiving a callback through an application programming interface provided by the file system.

6. A computer system, comprising:
a processing cluster including a plurality of physical or virtual processing modes, the computer system comprising at least one processor for executing program instructions;
at least one memory coupled to the processor for executing the program instructions; and
program instructions stored within the at least one memory for providing event notification within the computer system, the program instructions comprising program instructions for
receiving a request from a remote node of the plurality of physical or virtual processing nodes at a local node of the plurality of physical or virtual processing nodes that differs from the remote node that the remote node should be notified of occurrences of a particular event type, wherein the request is supplied in conjunction with an identifier of the remote node,
responsive to receiving the request, determining whether or not a first local event consumer executing on the local node is registered to receive notifications of events of the event type on the local node,
responsive to determining that a first local event consumer executing on the local node is not registered to receive notification of events of the event type on the local node, registering for the event type on the local node by a proxy event consumer,
responsive to determining that a first local event consumer executing on the local node is registered to receive notification of events of the event type on the local node, not performing the registering for the event type on the local node by the proxy event consumer;
detecting that an event of the event type has occurred on the local node, and
responsive to detecting that the event matching the event type has occurred on the local node, sending a notification of the event from the proxy event consumer to the remote node using the identifier, wherein if the registering for the event type on the local node by the proxy event consumer was not performed, the proxy event consumer sends a copy of an event notification that has been provided to the first local event consumer.

7. The computer system of claim 6, wherein the program instructions for registering comprise program instructions for registering a listener thread as the proxy event consumer for the event type, and wherein the listener thread performs the detecting by receiving an event notification from an event producer.

8. The computer system of claim 6, wherein the program instructions for determining determine that the first local event consumer is registered to receive notifications of events of the event type, wherein the listener thread performs the detecting by observing communication of an event notification from an event producer to the first local event consumer, and wherein the sending is performed by the listener thread by copying the event notification and sending the event notification to the remote node.

9. The computer system of claim 6, wherein the program instructions further comprise program instructions for:
at an event management interface, receiving a request from a second event consumer on the remote node that the second event consumer should be notified of occurrences of a particular event type occurring on a subset of the nodes; and
sending notifications only to nodes in the subset that the second event consumer should be notified of occurrences of the particular event type.

10. The computer system of claim 6, wherein the program instructions for registering comprise program instructions for issuing an open request and a write request at an interface of a file system that implements event notification in the computer system, and wherein the detecting an event comprises receiving a callback through an application programming interface provided by the file system.

11. A computer program product comprising a computer-readable storage device storing program instructions for execution within a computer system, the computer system comprising a processing cluster including a plurality of physical or virtual processing modes, wherein the program instructions are program instructions for providing event notification within the computer system, the program instructions comprising program instructions for:
receiving a request from a remote node of the plurality of physical or virtual processing nodes at a local node of the plurality of physical or virtual processing nodes that differs from the remote node, that the remote node should be notified of occurrences of a particular event type, wherein the request is supplied in conjunction with an identifier of the remote node;
responsive to receiving the request, determining whether or not a first local event consumer executing on the local node is registered to receive notifications of events of the event type on the local node;
responsive to determining that a first local event consumer executing on the local node is not registered to receive notification of events of the event type on the local node, registering for the event type on the local node by a proxy event consumer;
responsive to determining that a first local event consumer executing on the local node is registered to receive notification of events of the event type on the local node, not performing the registering for the event type on the local node by the proxy event consumer;
detecting that an event of the event type has occurred on the local node; and
responsive to detecting that the event matching the event type has occurred on the local node, sending a notification of the event from the proxy event consumer to the remote node using the identifier, wherein if the registering for the event type on the local node by the proxy event consumer was not performed, the proxy event consumer sends a copy of an event notification that has been provided to the first local event consumer.

12. The computer program product of claim 11, wherein the registering registers a listener thread as a proxy consumer for the event type, and wherein the listener thread performs the detecting by receiving an event notification from an event producer.

13. The computer program product of claim 11, wherein the program instructions for determining determine that the first local event consumer is registered to receive notifications of events of the event type, wherein the listener thread performs the detecting by observing communication of an event notification from an event producer to the first local event consumer, and wherein the sending is performed by the listener thread by copying the event notification and sending the event notification to the remote node.

14. The computer program product of claim 11, wherein the program instructions further comprise program instructions for:

at an event management interface, receiving a request from a second event consumer on the remote node that the second event consumer should be notified of occurrences of a particular event type occurring on a subset of the nodes; and sending notifications only to nodes in the subset that the second event consumer should be notified of occurrences of the particular event type.

15. The computer program product of claim 11, wherein the program instructions for registering issue an open request and a write request at an interface of a file system that implements event notification in the computer system, and wherein the detecting an event comprises receiving a callback through an application programming interface provided by the file system.

\* \* \* \* \*